Aug. 22, 1933.    W. N. BOOTH    1,923,476
METHOD OF FORMING SUSPENSION WIRE WHEELS
Original Filed Nov. 3, 1928
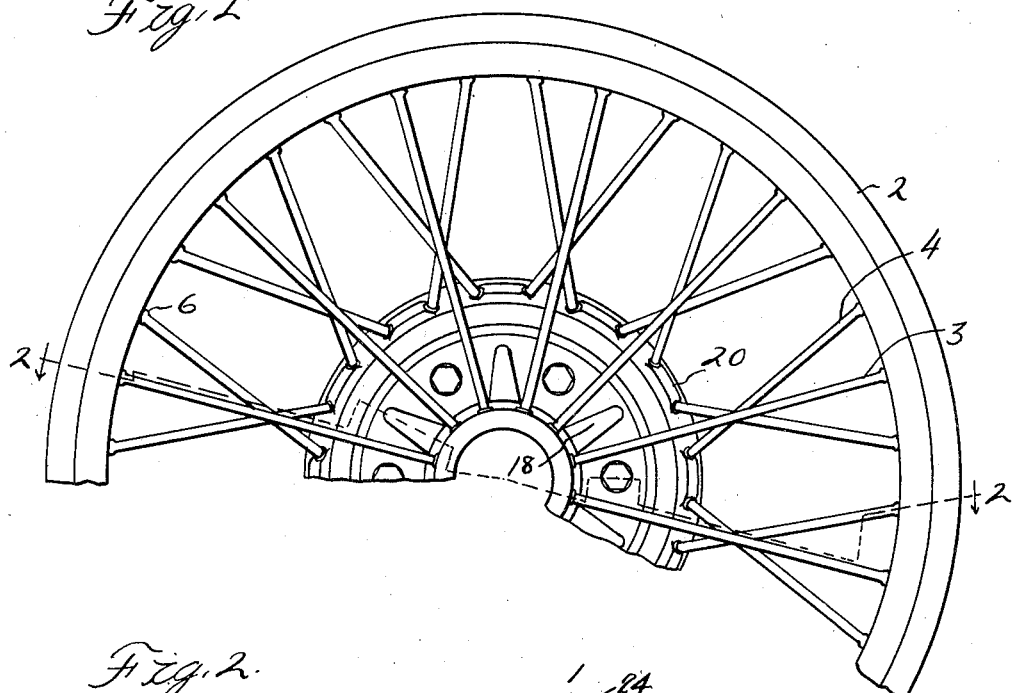
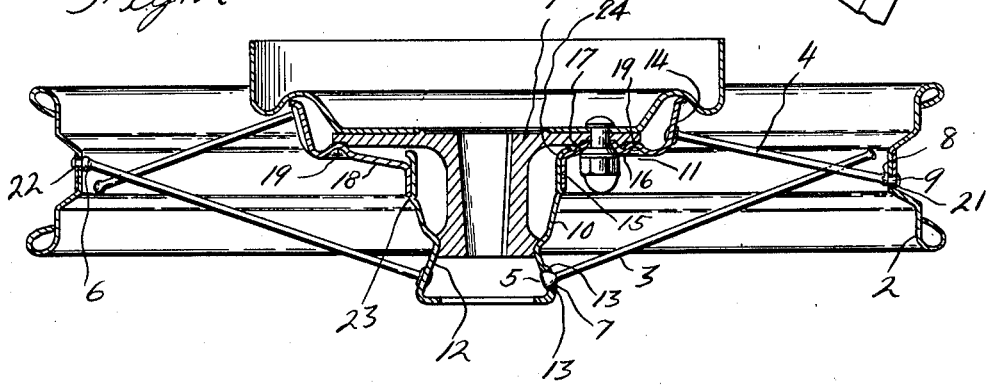
INVENTOR
William N. Booth
BY
ATTORNEYS Patented Aug. 22, 1933

1,923,476

UNITED STATES PATENT OFFICE 1,923,476

METHOD OF FORMING SUSPENSION WIRE WHEELS

William N. Booth, Detroit, Mich., assignor to Kelsey-Hayes Wheel Corporation, Detroit, Mich., a Corporation of New York Application November 3, 1928, Serial No. 317,100
Renewed January 12, 1931

9 Claims. (Cl. 29—159.02)

The invention relates to the method of forming a suspension wire wheel and has for one of its objects the forming of a wire wheel in a manner to expedite its assembly, assure its accuracy and tension its spokes. Another object is to so form the wire wheel that it may be readily secured to a wheel hub. With these as well as other objects in view, the invention resides in the novel features of construction and combinations and arrangements of parts as more fully hereinafter set forth.

In the drawing:—

Figure 1 is a front elevation of a portion of a vehicle wheel embodying my invention;

Figure 2 is a cross section on the line 2—2 of Figure 1.

The suspension wire wheel, as shown, is of the demountable type and is designed particularly for use with motor vehicles. This wire wheel has the hub member or hub shell 1, the rim member 2, which may be a tire carrying rim or a felly and is in the present instance a drop base tire carrying rim, and the front and rear series of spokes 3 and 4, respectively. These spokes are formed preferably by rolling and then drawing, after which they are upset by suitable dies while in a cold condition to form the enlargements 5 and 6, respectively, at their inner and outer ends, which provide annular load carrying and positioning shoulders 7 and 8, respectively, facing in the same direction and located at fixed or predetermined distances apart. The enlargements 5 are in the nature of heads and the enlargements 6 are spaced from the outer ends of the spokes a sufficient distance to provide the tenons 9. These tenons have substantially the same cross sectional area as the main portions of the spokes between the enlargements and the axes of the tenons are inclined to the axes of the main portions so that the tenons may extend radially through the rim member. My co-pending application Serial Number 317,099 relates more particularly to the spokes and the method of their manufacture.

The rim member is formed of sheet metal and its portions or seats for engaging the spoke shoulders 8 are die-fashioned, preferably while the rim member is in cold condition. The hub member or hub shell is formed of the front or barrel and rear or flange sections 10 and 11, respectively. These sections are pressed or drawn from sheet metal blanks in suitable dies. The barrel section is formed at its front end with the annular bead 12 having the peripheral bosses 13, which are die-fashioned while in cold condition to form the shoulders or seats for engaging the shoulders 7 at the inner ends of the front series of spokes. The flange section 11 is formed with the transverse annular flange 14 at its outer edge, the transverse annular flange 15 at its inner edge and the radially extending portion 16 connecting these annular flanges. This radially extending portion is used in securing the wire wheel to the wheel hub and, as shown, has the angularly spaced tapered depressions 17 between which are located the radially extending reinforcing ribs 18 and beyond which is located the annular reinforcing rib 19. The annular flange 14 is formed with the peripherally spaced bosses 20 having side walls with portions or seats for engaging the shoulders 7 at the inner ends of the rear series of spokes. These portions or seats are formed by a die-fashioning operation while the bosses are in cold condition and are formed in the side walls of the bosses to facilitate the use of rear spokes arranged at angles to the radii of the wheel passing through the inner ends of the spokes.

After the forming of the rim member 2, the front and rear series of spokes 3 and 4, respectively, and the barrel and flange sections 10 and 11, respectively, of the hub member or hub shell 1, these sections are first telescopically engaged and then the rear series of spokes are passed outwardly through the bosses 20 of the flange section. The load carrying shoulders 7 of these spokes are forced firmly against the shoulder engaging portions or seats upon the bosses and held in this position, while the shoulder engaging portions or seats upon the rim member 2 are brought into firm engagement with the positioning shoulders 8 of these spokes and the tenons 9 are riveted over tightly against the rim member to form shoulders 21 opposed to the shoulders 8 for holding the latter shoulders against the rim member, these opposed shoulders also being adapted to carry the load upon these spokes. The front series of spokes 3 are then inserted outwardly through the bosses 13 of the barrel section and the load carrying shoulders 7 of these spokes are forced firmly against the portions or seats formed in the bosses and held in this position while the portions or seats of the rim member 2 are brought ito firm engagement with the positioning shoulders 8 of these spokes and the tenons 9 of these spokes are riveted over to form the shoulders 22 in contact with the rim member and opposed to the shoulders 8 to hold the latter in engagement with the rim member, these opposed shoulders also being adapted to carry the load of these spokes. With this construction and method of assembly, it will be seen that the barrel and flange sections of the hub member or hub shell are located concentrically relative to the rim member. To tension both front and rear series of spokes, the barrel and flange sections are then relatively moved axially away from each other, after which their telescoping portions are rigidly secured to each other in a position holding the spokes under tension. With the present method the barrel section 10 is punched outwardly to form the tongues 23 abutting the outer edge of the annular flange 15 of the flange section and the inner portion of the barrel section is crimped outwardly to form the flange 24 abutting the rear face of the radially extending portion 16 of the flange section adjacent to its junction with the annular flange 15.

From the above description it will be readily seen that I have so constructed a suspension wire wheel that its parts may be readily and economically manufactured and assembled. It will also be seen that since the shoulder of the spokes and the shoulder engaging portions or seats of the hub and rim members are die-fashioned, they will be accurately located to accurately concentrically locate the hub and rim members relative to each other.

What I claim as my invention is:

1. The method of forming a suspension wire wheel which includes forming a sectional hub member and a rim member, forming annular shoulder engaging portions upon the hub member sections and rim member, forming spokes with load carrying and positioning shoulders facing in the same direction and at fixed distances from each other for engaging the annular shoulder engaging portions of the hub and rim members, assembling the spokes with the hub member sections and rim member by a movement of the spokes in one direction to engage the shoulders of the spokes with the annular shoulder engaging portions of the hub and rim members and thereby concentrically locate the hub member sections and rim member, securing the spokes to the one of the hub and rim members with which the positioning shoulders are engaged to maintain such engagement and to carry the load, relatively moving the hub member sections to tension the spokes and holding the spokes in a relative position where the spokes are maintained under tension.

2. The method of forming a suspension wire wheel which includes forming a hub member with telescoping sections and a rim member, forming annular shoulder engaging portions upon the hub and rim members, forming spokes with load carrying carrying and positioning shoulders facing in the same direction and at fixed distances from each other for engaging the annular shoulder engaging portions, assembling the spokes with the hub member sections and rim member by a movement of the spokes in one direction to engage the positioning shoulders of the spokes with the annular shoulder engaging portions of the hub and rim members, forming shoulders upon the spokes opposed to the positioning shoulders and abutting one of the hub and rim members with which the positioning shoulders are engaged to maintain such engagement and to carry the load, axially moving the hub member sections relative to each other to place the spokes under tension and securing the telescoping parts of the sections in a relative position where the spokes are maintained under tension.

3. The method of forming a suspension wire wheel which includes forming a hub member with telescoping sections and a rim member, forming shoulder engaging portions upon the hub and rim members, forming spokes with enlargements providing load carrying and positioning shoulders at fixed distances from each other and facing in the same direction for engaging the shoulder engaging portions of the hub and rim members, assembling the spokes with the hub member sections and rim member to engage the positioning shoulders of the spokes with the shoulder engaging portions of the hub and rim members, securing the spokes to one of the hub and rim members with which the positioning shoulders are engaged to maintain such engagement and to carry the load, relatively moving the hub member sections to tension the spokes and securing the sections in a relative position where the spokes are maintained under tension.

4. The method of forming a suspension wire wheel which includes forming a hub member with telescoping sections and an annular rim member, forming annular shoulder engaging portions upon the hub member sections and rim member, forming spokes with enlargements near their ends providing load carrying and positioning shoulders facing in the same direction and at fixed distances from each other for engaging the annular shoulder engaging portions of the hub and rim members and with tenons extending from the load positioning shoulders, assembling the spokes with the hub member sections and rim member to engage the positioning shoulders of the spokes with the annular shoulder engaging portions of the hub and rim members, securing the tenons to one of the hub and rim members with which the positioning shoulders are engaged to maintain such engagement and to carry the load, relatively moving the hub member sections to tension the spokes and securing the sections in a relative position where the spokes are maintained under tension.

5. The method of forming a suspension wire wheel which includes die-fashioning sheet metal barrel and flange sections, telescopically engaging the sections to form a hub member, forming a rim member, die-fashioning annular spoke shoulder engaging portions upon the barrel and flange sections and rim member, forming spokes with die-fashioned annular load carrying and positioning shoulders at fixed distances from each other and facing in the same direction for engaging the annular spoke shoulder engaging portions of the hub and rim members, assembling the spokes with the barrel and flange sections and rim member to engage the positioning shoulders of the spokes with the annular shoulder engaging portions of the hub and rim members, securing the spokes to one of the hub and rim members with which the positioning shoulders are engaged to maintain such engagement and to carry the load, relatively moving the barrel and flange sections to tension the spokes and securing the telescoping portions of the sections in a relative position where the spokes are maintained under tension.

6. The method of forming a suspension wire wheel, which comprises drawing from a sheet metal blank a barrel section, drawing from a sheet metal blank a flange section with an annular flange of less length than the barrel section, telescopically engaging the annular flange with the rear end of the barrel section, forming a rim member, forming shoulder engaging portions upon the barrel and flange sections and the rim member, forming spokes with load carrying and positioning shoulders facing in the same direction and at fixed longitudinal distances apart for engaging the shoulder engaging portions of the barrel and flange sections and the rim member, assembling the spokes with the barrel and flange sections and the rim member to engage the positioning shoulders with the shoulder engaging portions of the barrel and flange sections and rim members, securing the spokes to one of the barrel and flange sections and rim member with which the positioning shoulders are engaged to maintain such engagement and to carry the load, relatively moving the barrel and flange sections in a direction to tension the spokes, and securing the barrel and flange sections through the annular flange in a relative position where the spokes are maintained under tension.

7. In a vehicle wire wheel, a wheel body having hub and rim members and spokes connected to said hub and rim members, said hub member having a sheet metal barrel section provided with annular seats for engaging certain of said spokes, and a sheet metal flange section provided with annular seats for engaging certain other of said spokes, one of said sections having at one end of said hub member a portion for securing said hub member to a wheel hub, said spokes having enlargements providing load carrying and positioning shoulders at fixed distances from each other and facing in the same direction for engaging said annular seats, means upon said spokes for securing said positioning shoulders against one of said rim and hub members, said barrel and flange sections having telescopically engaging portions whereby after said spokes have been connected to said rim member and hub member, said barrel and flange sections may be axially separated to tension said spokes, and means for permanently securing the telescoping portions of said barrel and flange sections to each other in a position to place said spokes under tension.

8. In a vehicle wheel, a wheel body having hub and rim members and spokes connected to said members, said hub member having a sheet metal barrel section provided with annular seats at its front end for engaging certain of said spokes and a sheet metal flange section at the rear end of said barrel section provided with annular seats for engaging certain other of said spokes and with an annular flange of less length than said barrel section, one of said sections having a radially extending portion for securing said hub member to a wheel hub, said spokes having load carrying and positioning shoulders facing in the same direction and at fixed distances from each other for engaging said annular seats, means upon said spokes for securing said positioning shoulders tightly against one of said members, said barrel section and annular flange of said flange section being in telescoping engagement whereby after said spokes have been assembled and secured to said hub and rim members said sections may be axially separated to tension said spokes, and means for permanently securing said barrel section and annular flange of said flange section to each other in a position placing said spokes under tension.

9. The method of forming a suspension wire wheel, which comprises providing a hub member having sections and a rim member, providing the sections and rim member with annular shoulder engaging portions upon each, providing spokes having shoulders for engaging the annular shoulder engaging portions of the hub and rim members, telescopically engaging the sections, assembling the spokes with the sections and the rim member by passing the spokes longitudinally through the annular shoulder engaging portions of the sections and the rim member, securing the shoulders of all of the spokes against all of the annular shoulder engaging portions of one of the hub and rim members, then relatively moving the sections to place all of the annular shoulder engaging portions under stress and to tension the spokes, and finally securing the sections by the telescoping portions thereof in a relative position, where all of the spokes are maintained under tension.

WILLIAM N. BOOTH.